Dec. 13, 1966 TAKEO ESAKA 3,290,807

LAUNDRY PRESSES

Filed Sept. 24, 1963 11 Sheets-Sheet 3

Dec. 13, 1966 TAKEO ESAKA 3,290,807

LAUNDRY PRESSES

Filed Sept. 24, 1963 11 Sheets-Sheet 4

Dec. 13, 1966 TAKEO ESAKA 3,290,807

LAUNDRY PRESSES

Filed Sept. 24, 1963 11 Sheets-Sheet 6

Dec. 13, 1966 TAKEO ESAKA 3,290,807

LAUNDRY PRESSES

Filed Sept. 24, 1963 11 Sheets-Sheet 7

Dec. 13, 1966 TAKEO ESAKA 3,290,807

LAUNDRY PRESSES

Filed Sept. 24, 1963 11 Sheets-Sheet 8

Dec. 13, 1966 TAKEO ESAKA 3,290,807

LAUNDRY PRESSES

Filed Sept. 24, 1963 11 Sheets-Sheet 11

United States Patent Office 3,290,807

Patented Dec. 13, 1966

3,290,807

LAUNDRY PRESSES

Takeo Esaka, Toyonaka-shi, Japan, assignor to Matsushita Electric Industrial Co., Osaka, Japan, a corporation of Japan Filed Sept. 24, 1963, Ser. No. 310,990
Claims priority, application Japan, June 25, 1963, 38/33,613
15 Claims. (Cl. 38—71)

The present invention relates to novel apparatus adapted for hot-pressing of articles of clothing such as trousers, skirts, handkerchiefs or neckties.

An object of the invention is to provide a laundry press wherein heating elements comprise cloth-like heaters composed of flexible electric heating wires of small diameter interwoven with threads of heat-resisting fibers, and heating means comprising such heating elements are disposed on pressing surfaces to occupy a substantial area thereof, whereby articles to be pressed can be uniformly hot-pressed irrespective of their size and abutting positions relative to the pressing surfaces, and a plurality of articles such as a combination of trousers and neckties or skirts and handkerchiefs can be simultaneously pressed.

Another object of the invention is to provide an excellent laundry press wherein uniform temperature distribution in the order of 100° C. and below is obtained at any portions of pressing surfaces by the use of heating means comprising heating elements in the form of said cloth heaters so that hot-press of articles to be pressed can be performed at a uniform temperature suitable for hot-pressing, that is, in the order of 70° C., whereby said articles can be uniformly hot-pressed and at the same time an excellent pressing effect as well as a simpler and more reasonable pressing operation can be made without any injury on the cloth as compared with ironing.

Yet another object of the invention is to provide a conveniently usable laundry press of compact overall structure which comprises two plates openably coupled together by means of a hinged connection, one of said two plates serving as a heating member by being provided with the heating means constituted of heating elements in the form of said cloth heaters, and the other acting as a holding member by being provided with a cushion member.

Still another object of the invention is to provide an excellent laundry press wherein said cloth heater comprises a cloth of a predetermined size woven of warps and woofs of heat-resisting fibers, conductive metal wires of flexible nature disposed lengthwise on both sides of the cloth and interwoven with the warps, and electric heating wires disposed transversely between said conductive metal wires situated on both sides of the cloth and woven into the cloth zigzag-wise in the direction of said woofs in predetermined spaced apart relationship with the woofs so that said heating wires are disposed in a wave-like form with respect to the cloth surface, said heating wires each having heat-resisting threads coiled thereabout at a rate of a predetermined number of turns per unit length thereof, and said heating wires being wound about said conductive wires alternately on the left- and right-hand sides at turned-in portions with a predetermined space therebetween.

A further object of the invention is to provide an excellent heating means which comprises a moisture-proof film of heat-resisting, moisture-resisting and moisture impervious properties adhered or otherwise attached to at least the pressing surface of said cloth heater, whereby the cloth heater can maintain its electrically insulated state and can be protected against injury with the resulting prolongation of its life.

A still further object of the invention is to provide a laundry press wherein a cushion member in the form of a sheet of a foamed plastic such as polyurethane or of foam rubber is provided at least on the pressing surface of said heating means disposed at least on one of the two members of hinged connection and the opposing surface of the holding member, whereby uniform pressure can be applied on any portions of articles to be pressed even when the articles have non-uniform thickness. The sheet of the foamed plastic, when used on the back face of the heating means, can be utilized to serve as an electrically insulating means, and any moisture produced by the articles during the hot-pressing operation can be discharged outwardly of the contact portion between the heating and holding members to thereby prevent the wet state of the pressing surfaces immediately after the hot-pressing due to the presence of moisture.

Yet a further object of the invention is to provide a laundry press wherein said cloth heater, the moisture-proof film formed at least on the pressing surface of said cloth heater to constitute the heating means together with said heater, and the sheet of foamed plastic disposed at least on the pressing surface of said heating means are integrally fastened together to form a resilient heating assembly including said sheet of foamed plastic, whereby rugged and uneven touch (rough feel) can be eliminated from the pressing surface of the heating means in order to thereby provide a uniform hot-pressing effect on articles to be pressed.

An additional object of the invention is to facilitate the manufacture of the heating means as desired comprising constituting the heating element of the heating means from said cloth heater, by suitably cutting said cloth heater depending on a quantity of heat requirement, and by bonding the cut-off portion of said cloth heater integrally with said cushion member.

Another additional object of the invention is to provide a safely usable laundry press wherein a safety means is incorporated in said heating means, whereby power supply can reliably be cut off by said safety means when the temperature of said heating means reaches an abnormal value.

A further additional object of the invention is to provide a laundry press which is provided with a clamping means for clamping said heating and holding members together, whereby said heating and holding members are made to be resiliently urged towards each other during the hot-pressing operation so that the desired pressing operation can be smoothly and positively performed independently of varying thicknesses of articles to be pressed.

Another object of the invention is to provide a convenient laundry press wherein a recess is formed at one portion of said holding member or at one end in the longitudinal direction thereof, said recess being slightly receded from the pressing surface thereof, so that, during the hot-pressing of trousers especially, portions closed by sewing between the thigh and waist portions of said trousers, i.e., portions of pockets can be accommodated in said recess, whereby the entirety of the trousers except the portions received in said recess can be uniformly hot-pressed under a reasonable pressing operation.

According to the present invention, there is provided a laundry press comprising a heating member and a holding member openably coupled together by means of a hinged connection, said heating member including a plate, heating means disposed on said plate, said heating means being principally formed of a cloth-like heater constituted of electric heating wires interwoven with heat-resisting threads, and a cushion member embracing said heating means and fastened onto said plate, and said holding member including a plate and a cushion member fastened onto said plate on the side opposite said heating means, a temperature regulator provided on said heating member for maintaining the heating temperature of said heating means at a desired regulated value, and clamping means for releasably clamping said heating member and said holding member.

Still other objects and advantages of the invention will be more clearly understood from the following description with reference to the accompanying drawings, in which.

Figure 28:
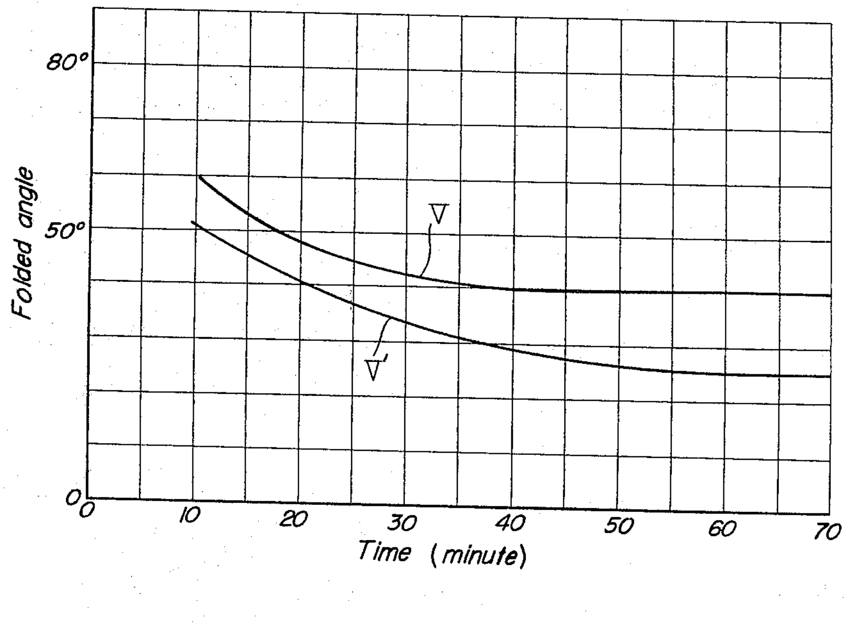
Figure 29:
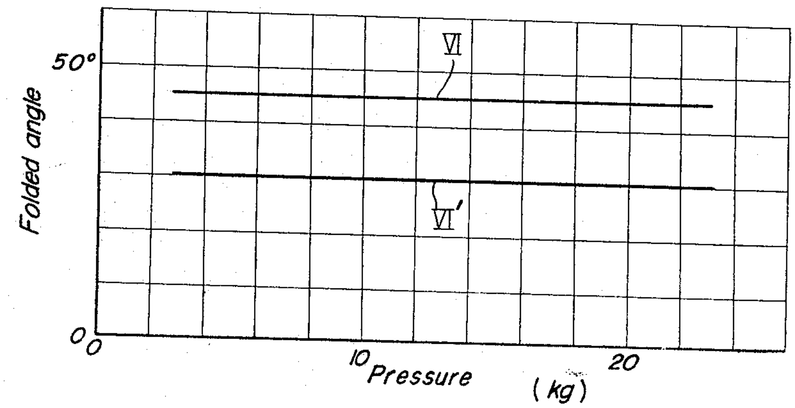

FIGS. 22 through 27 are graphical illustrations of relationship between the temperature and the pressing effect when predetermined cloths are pressed by the laundry press of the invention under a constant compressing force and time for hot-pressing, wherein the figures respectively show the cases of thick worsted, thick flano, thin worsted, thin pin-head, thin poral, and thin cloth of polyester resin blended with wool;

FIG. 28 is a graphic illustration of relationship between the pressing effect and the time when a predetermined cloth is pressed by the laundry press of the invention under a constant heating temperature and compressing force; and FIG. 29 is also a graphic illustration of relationship between the pressing effect and the compressing force when a predetermined cloth is pressed by the laundry press of the invention under a constant heating temperature and hot-pressing time.

Now, the construction and arrangement of the laundry press of the invention will be explained with reference to FIGS. 1 through 5. In the drawings, the laundry press according to the invention is generally indicated at reference numeral 1, and comprises a pair of members, or an upper member 2 and a lower member 4. The upper or holding member 2 comprises a plate such as of wooden structure having a cushion member disposed thereinside as will be described later. The lower or heating member 4 likewise comprises a similar plate having heating means 3 and other members disposed thereinside as will also be described later. The holding member 2 and the heating member 4 are connected together along their longitudinal opposing edges by means of hinges each comprising arms 5 and 6 of rigid or resilient material so that the holding member 2 can be readily swung open relative to the heating member 4.

Hinge pins 8 connecting the arms 5 and 6 of the hinges are disposed closer towards the holding member 2 with respect to the contact plane of the holding member 2 and the heating member 4.

The heating member 4 is provided with supporting legs 9 on the bottom face thereof so that the laundry press 1 can be conveniently placed in a stable manner. Clamping springs 10 are disposed at the other longitudinal edge of the heating member 4 at suitable intervals therebetween and are pivotally mounted at one end thereof by pivots 11, while on the other end of said clamping springs 10, clamping claws 12 are pivotally mounted for clamping the holding member 2 against the heating member 4. From the foregoing, it will be seen that the hinged connection and the clamping springs constitute an extremely convenient locking means for the holding member 2 and the heating member 4, said locking means of an extremely simple structure being effective to facilitate the clamping and removal of articles to be pressed during the pressing operation.

A remarkable feature of the laundry press of the invention resides in the aforementioned heating means 3 disposed in the heating member 44. The heating means 3 comprises a heating element in the form of a cloth-like heater which is woven of heat-resisting threads such as of polyvinylformal and electric heating wires of flexible nature such as of stainless steel having a diameter in the order of 0.1 mm. A generally known heating means of conventional laundry presses has such an arrangement that two or three rows of Nichrome wires having a heat-generation capacity of more than 200° C. are disposed on both sides of a heating member. A notable fact is that the heating means of the invention is superior to the conventional means in that it provides greater distribution of heat on the pressing surfaces and provides more uniform temperature distribution in the order of 100° C. and below at any point of the pressing surfaces to thereby supply articles to be pressed with a temperature suitable for hot-pressing, that is, in the order of 70° C. This notable feature of the invention will be understood from the following description with reference to a specific embodiment shown in FIGS. 8 and 9.

Figure 8:
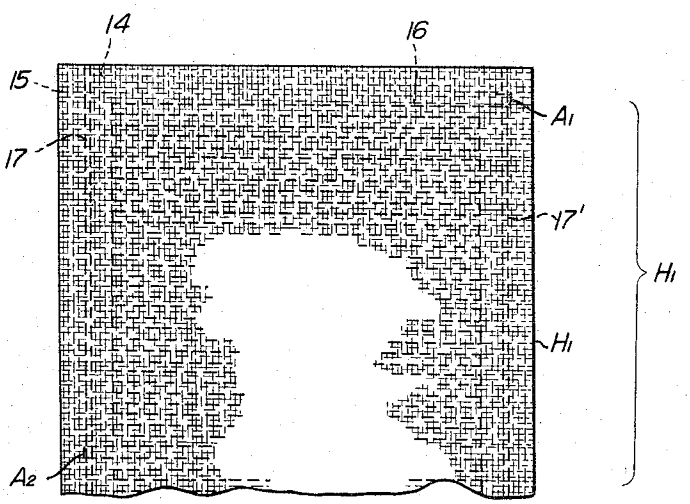
FIG. 8 is an enlarged plan view showing diagrammatically a portion of the cloth heater forming the heating means of the apparatus shown in FIGS. 1 through 3.
Figure 9:
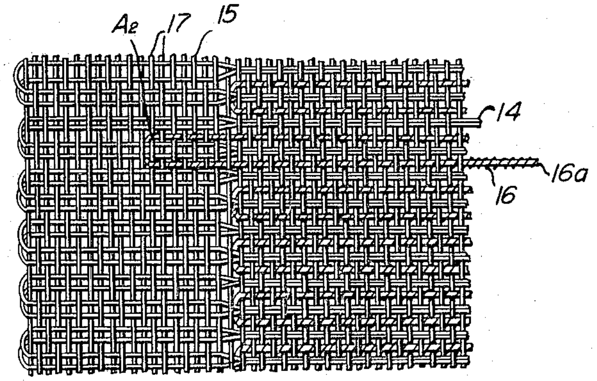
FIG. 9 is a further enlarged view showing the detailed structure of a portion of the cloth heater of FIG. 8.

The heating element of the heating means 3 in the specific embodiment comprises a tape-like cloth woven of woofs 14 and warps 15 both of heat-resisting and electrically insulating fibres such as cotton, synthetic fibers or glass fibers, said tape-like cloth having a predetermined width which is slightly shorter than the longitudinal length of the heating member 4. During weaving of said cloth, conductive metal wires 17, 17' having a diameter of about 0.2 mm. are interwoven with the warps 15 on both sides of the cloth. At the same time, electric heating wires 16 of flexible nature having a diameter of about 0.1 mm. are woven into the cloth between the metal wires 17, 17' positioned on both sides in a manner that the heating wires are parallelly disposed so as to be spaced apart a suitable distance with respect to the woofs 14. Said heating wires 16 have a string of electrically insulating threads 16*a* of cotton, synthetic fibers or glass fibers suitably coiled thereabout at a rate of 100 to 500 turns per meter. The manner of disposition of the heating wires 16 may be as shown in FIG. 9, wherein the heating wires are woven zigzagwise into the cloth in the direction of the woofs 14 in a manner that the wires are disposed between alternate woofs 14 so as to make a wavy form with respect to the cloth surface. Further, the heating wires 16 are wound about the metal wires 17 and 17' alternately on left- and right-hand sides at intervals of a predetermined distance at turned-over portions of the wavy form as shown by FIGS. 8 and 9. The tape-like cloth thus produced is cut into a desired length to form the cloth-like heater $H_1$ (hereinafter merely referred to as cloth heater).

This cloth heater $H_1$ can be cut into a predetermined length to provide a heater having a desired value of electrical resistance. Supposing that, in FIG. 8, the resistance value of the heating wire 16 between the points $A_1$ and $A_2$ where the heating wire 16 contacts the metal wires 17' and 17, respectively, is 100 ohms, then a cloth heater developing 100 watts under 100 volts can be obtained by cutting the cloth heater to have the heating wire length of between the points $A_1$ and $A_2$. It is obvious that twice as much length will give a heater of 200 watts.

Thus, it will be seen that a cloth heater of any desired heating capacity can be optionally obtained by the cut-off position of the cloth heater $H_1$. The heating wires 16 of the cloth heater $H_1$ are connected through the conductive metal wires 17, 17' to a bimetal type thermostat 18 (FIG. 1) disposed in the heating member 4, said thermostat 18 being in turn connected to an electrical source by way of a conductor cord 19 and a plug 20.

The cloth heater $H_1$ of the invention entirely obviates the need of incorporation of a connection terminal block such as is especially required for connection of Nichrome wires in the conventional heating means which is provided with two or three rows of Nichrome wires having a heat generation capacity of more than 200° C. Therefore, it is apparent that the cloth heater has an advantage that connection of wiring to the heating means and incorporation thereof can be further simplified.

It will be understood that all the turned-over portions of the heating wires 16 disposed in wavy manner may be wound about the metal wires 17 and 17' instead of being wound at intervals of a predetermined distance as described above.

According to another embodiment of the cloth heater of the invention, the cloth heater comprises warps of quartz threads or the like having excellent heat-resisting and non-conductive properties interwoven with woofs of the same material as the warps and electrical heating wires of flexible nature, such as of stainless steel, having a diameter of about 0.1 mm. The properties of the quartz threads used are as follows:

(a) Coefficient of thermal expansion: $0.3\times10^{-6}$ cm./° C. (Magnesia $11\times10^{-6}$, copper $8.5\times10^{-6}$, alumina $7\times10^{-6}$, iron $5.7\times10^{-6}$, and borosilicate glass $2.5\times10^{-6}$, (b) Specific heat: 0.27 cal./g. at 600° C. and 0.3 cal./g. at 800° C.

(c) Heat conductivity: 0.04~0.042 cal./cm. sec. at 600° C. and 0.52~0.56 cal./cm. sec. at 800° C.

(d) Transmission of infrared ray: 185 mμ~4000 mμ.

(e) Electric insulating property: $60\times10^{-6}\Omega$ cm. at 600° C. and $4\times10^{-6}\Omega$ cm. at 800° C.

(f) Mechanical properties—Elastic modulus: Young's modulus, $7.25\sim7.78\times10^3$ kg./mm.$^2$ at 20° C. and $7.83\sim8.52\times10^3$ kg./mm.$^2$ at 900° C.; Rigidity, $3.1\sim3.4\times10^3$ kg./mm.$^2$ at 20° C. and $3.53\sim3.69\times10^3$ kg./mm.$^2$ at 900° C. Tensile strength: 8.1~11.3 kg./mm.$^2$ at 20° C. and 16.1~16.6 kg./mm.$^2$ at 900° C.

(g) Strongly chemicals-proof, except that corroded by hydrogen fluoride and concentrated phosphoric acid at more than 300° C.

The quartz threads have the properties as mentioned above and can accordingly be used at a temperature between 500° C. and 800° C.

Since the warps of quartz threads and the woofs of quartz threads and heating wires are interwoven with each other to form the cloth heater, the flexibility of the heater is not adversely affected as the heating wires are made to have a sufficient flexible property. The quartz threads have an excellent heat-resisting property as described above, which permits the use thereof at high temperatures, and the woofs of the quartz threads and the heating wires are woven with the warps of the quartz threads. Therefore, the cloth heater of this embodiment will show a stronger bending strength and a more excellent resistance to fatigue by repeated stress than in a heater composed of heating wires alone. The cloth heater will therefore be free from damage due to fatigue by repeated stress during weaving or during use and free from breaking of the heating wires or defective insulation.

The heating means 3 according to the invention is made by the following procedure: the cloth heater H (hereinafter the heater $H_1$ and other heaters are generally referred to as cloth heater H) made by the foregoing process is dipped into a polyester solution to form a coating thereon. Before the coating has dried up completely, a polyester film of a thickness in the order of 12/1000 mm. is forced onto both surfaces of the cloth heater for being fastened thereon by making use of the adhesion of said polyester coating. Then the cloth heater is dried for about 10 minutes at about 160° C. to obtain the heating means of plate-like shape of electrically insulated and flexible nature.

Figure 10:
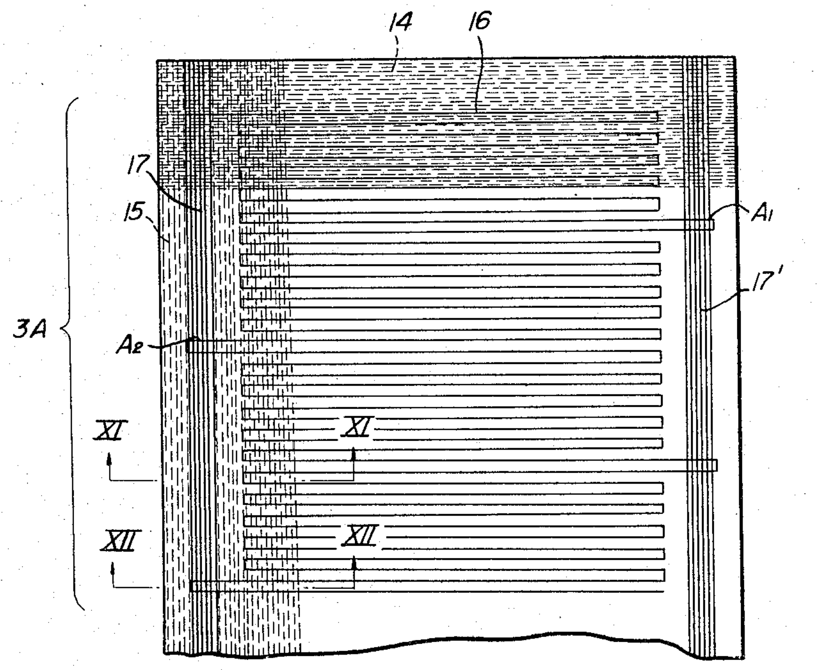
FIG. 10 is an enlarged plan view showing diagrammatically a portion of another embodiment of the heating means.
Figure 11:
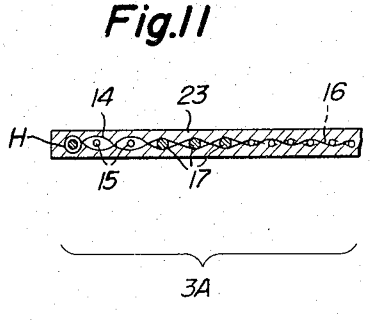
FIG. 11 is a diagrammatic enlarged sectional view taken along the line XI—XI of FIG. 10.
Figure 12:
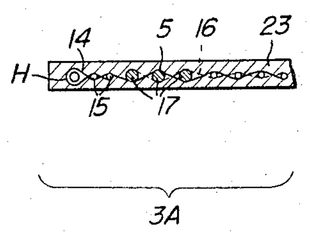
FIG. 12 is a view similar to FIG. 11, but section being taken along the line XII—XII of FIG. 10.

In FIGS. 10 through 12 which show another embodiment of the heating means 3, said cloth heater H is totally enclosed in an insulating coating of a synthetic resin material 23 to form a heating means 3A. The coating of the synthetic resin material 23 may be provided by the moulding of the synthetic resin material about the cloth heater H which is held centrally thereof, or the cloth heater H may be sandwiched between two thin sheets of the synthetic resin material which is preformed to suit the size of the heater. In this latter case, an adhesive such as neoprene is interposed on the thin sheets before being fastened together with the cloth heater H. This procedure will also provide the heating means of heat-resisting, electrically insulated and flexible nature which is approximately similar to the one obtained by dipping in the polyester solution and subsequently fastening the polyester films thereon.

Figure 13:
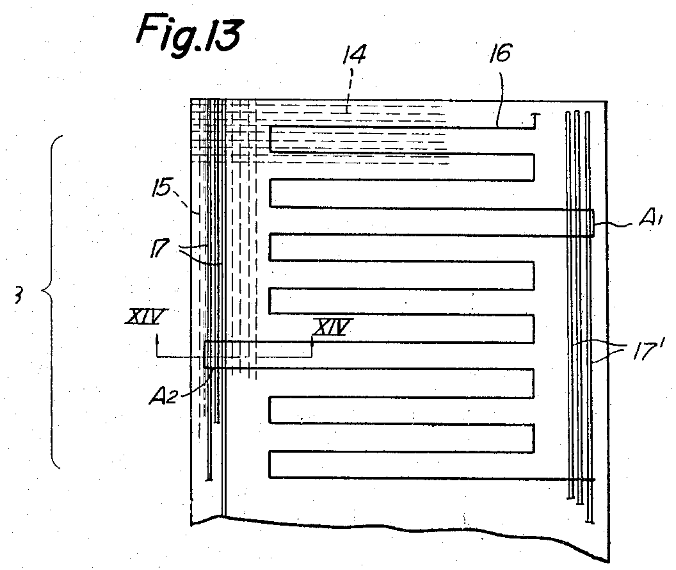
FIG. 13 is an enlarged plan view showing diagrammatically a portion of still another embodiment of the heating means.
Figure 14:
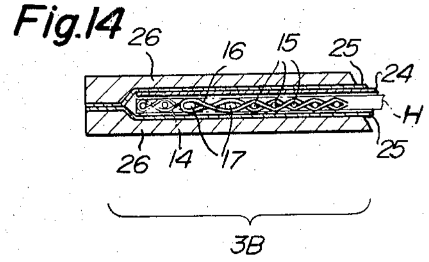
FIG. 14 is a diagrammatic enlarged sectional view taken along the line XIV—XIV of FIG. 13.

Still another embodiment of the heating means 3 is shown in FIGS. 13 and 14. According to the heating means 3B of this embodiment, a moisture-proof film 24 of heat-resisting, moisture-resisting and moisture impervious properties is fastened at least on the pressing surface of the cloth heater H through an adhesive, and a thin layer 25 of a foamed plastic such as polyurethane or of foam rubber is fastened further thereonto. The entirety of the cloth heater H with the film and thin layers is further covered by a cushion member 26 on each face, said cushion member being of a synthetic resin or rubber material. Preferably, the cushion members may be preformed to suit the size of the cloth heater H and an adhesive may be interposed therebetween before being fastened onto the heater H to form the covering.

It will be understood that any of the heating means 3, 3A and 3B described above has the same heating capacity, heating area and heat distribution as the cloth heater H when used alone. According to the conventional method of forming such heating means, powder of a conductive material such as carbon is mixed with a resinous solution to form a conductive coating material, which is then adhered to a cloth of heat-resisting and electrically insulating properties in the form of a film by a suitable means. It will thus be known that the heating means of the invention has a better moisture-resisting property than in the conventional heating means and has an advantage that the heating capacity inherent therein will not be degraded as time elapses. The heating means 3B is especially useful in that it is extremely soft to the touch and can therefore be utilized as a heating equipment without any additional finish thereon.

Figure 15:
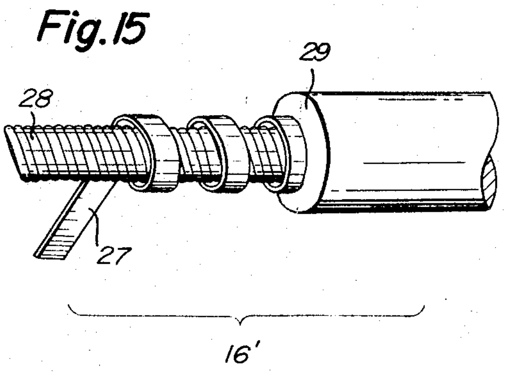
FIG. 15 is a fragmentarily enlarged perspective view of another embodiment of the heating wire employed in the heating means.

Next, explanation will be given with reference to an embodiment wherein a safety means is affixed to the cloth heater H. As best shown in FIG. 15, according to this embodiment the electric heating wire per se of the cloth heater H takes the form of an electric heating wire 16' which is made of a conductive material fusible at a temperature below 200° C. The heating wire 16' includes a core 28 which is formed of twisted yarns of about 0.5 mm. in diameter made of fibers of a heat-resisting material such as glass fibers or acidless artificial silk fibers. A conductive element 27 prepared in the form of a ribbon from said fusible conductive material is then spirally wound about the core 28, the entirety of these elements being then covered by a resinous material 29 such as polyvinyl chloride or polyvinyl alcohol to provide the flexible and fusible heating wire 16' of about 1.0 to 1.5 mm. in diameter.

The components of said conductive element 27 may be as shown in the following table:

| Binary system | | | Ternary system | | | |
|---|---|---|---|---|---|---|
| Percent | | Fusing temp., ° C. | Percent | | | Fusing temp., ° C. |
| Pb | Sn | | Bi | Pb | Sn | |
| 30 | 70 | 186.7 | 34 | 43 | 23 | 111.7 |
| 35 | 65 | 185.2 | 37 | 43 | 20 | 110.2 |
| 37 | 63 | 184.8 | 40 | 40 | 20 | 109.0 |
| 40 | 60 | 185.5 | 40 | 37 | 23 | 107.4 |
| 45 | 55 | 186.0 | 41 | 35 | 24 | 104.1 |
| 50 | 50 | 186.5 | 42 | 33 | 25 | 103.6 |

As known from the above table, it will be apparent that the conductive element 27 is fused off at a temperature below 200° C.

The fusible heating wire 16' is constituted of the conductive element 27 having such properties as described above. When said cloth heater H incorporating such heating wire is provided in, for example, an electric blanket, an excellent effect will be demonstrated in the event of occurrence of an unusual condition during the use. Or more precisely, the conventional heating wire, being generally of a copper alloy, is liable to reach a critical temperature and often induces a fire when a thermostat becomes inoperative since the heating wire has a high melting point of 1800° C. Therefore, a considerable device has been required for wiring arrangement and mounting of the thermostat to prevent the outbreak of fires. On the contrary, in the case of the fusible heating wire of the invention, the heating wire is readily fused off to cease the generation of heat once a critical temperature is reached even when a thermostat, which will be described later, for controlling the temperature of the conductive element 27 is out of order. Thus, the heating wire of the invention can completely eliminate the danger of fire.

Figure 16:
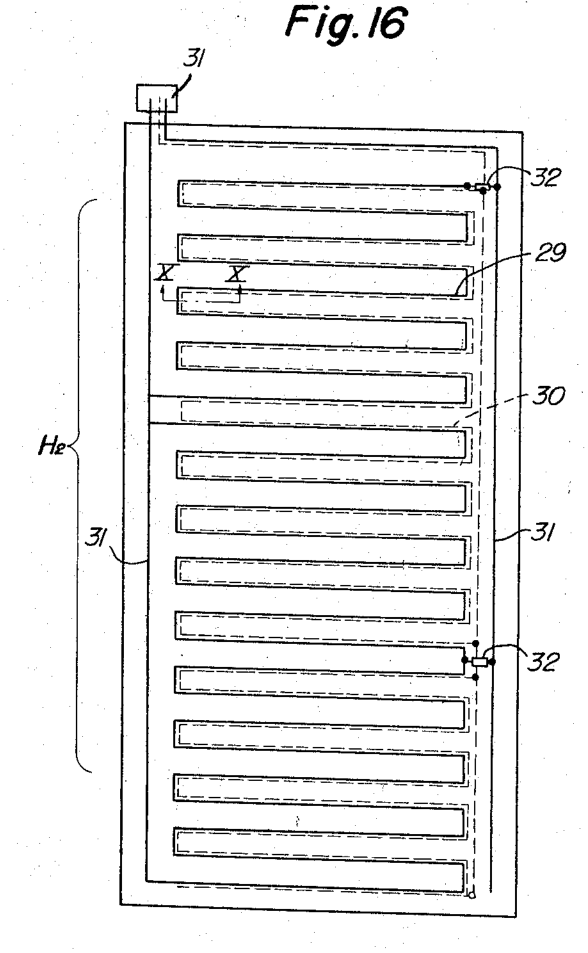
FIG. 16 is a diagrammatic and perspective plan view of yet another embodiment of the heating means which is provided with detecting wires for temperature control in its heating circuit.
Figure 17:
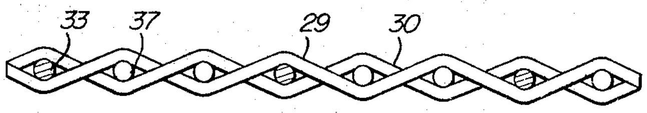
FIG. 17 is a diagrammatic enlarged sectional view taken along the line XVII—XVII of FIG. 16.

FIGS. 16 and 17 show another embodiment of a safety means incorporated in a cloth heater. The cloth heater $H_2$ according to this embodiment is substantially similar to those described in the foregoing, and the safety means takes the form of an electrical circuit. Or more precisely, heating wires 29 and detecting wires 30 are woven, in close juxtaposition relation with each other, into the cloth zigzag-wise as part of the woofs so that they are disposed in a wavy form with respect to the cloth surface. While warps comprise semi-conductive glass threads 33 and heat-resisting threads 37, lead wires 31 having a lower resistance than the heating wires 29 are disposed on both longitudinal extremities of the cloth heater and are led to a connection plug in a usual manner. Each length of the heating wires 29 having the desired heat quantity is connected to the lead wires 31 at portions 32 suitably covered by a tube of polyvinyl chloride. The detecting wires 30 are connected to a temperature regulator. Therefore, heat developed by the heating wires 29 of the cloth heater $H_2$ is distributed throughout the cloth surface and a suitable temperature can be maintained by the temperature regulator. If any unusual condition might occur at some portion, temperature rise would be developed at the specific portion and the resistance of the semi-conductive glass threads thereat would be reduced. The heating wire 29 and the detecting wire 30 at the portion will show a reduced resistance, which will actuate the temperature regulator for cutting off the current to the heating wires 29. Therefore, the unusual temperature at the portion will go down and the overheated portion will be restored to the normal state, the temperature regulator starting to work again. Thus, the heating wires 29 again receive the current supply and any failure can be prevented from occurring.

Figure 18:
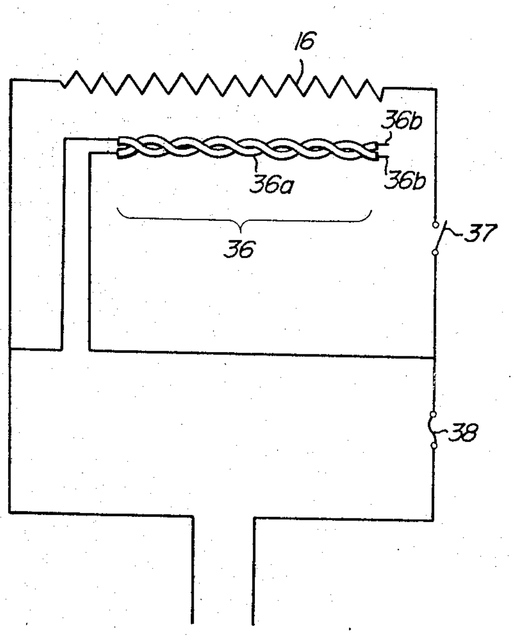
FIG. 18 is a circuit diagram of further another embodiment of the heating means which is provided with security wires for temperature control in its heating circuit.
Figure 22:
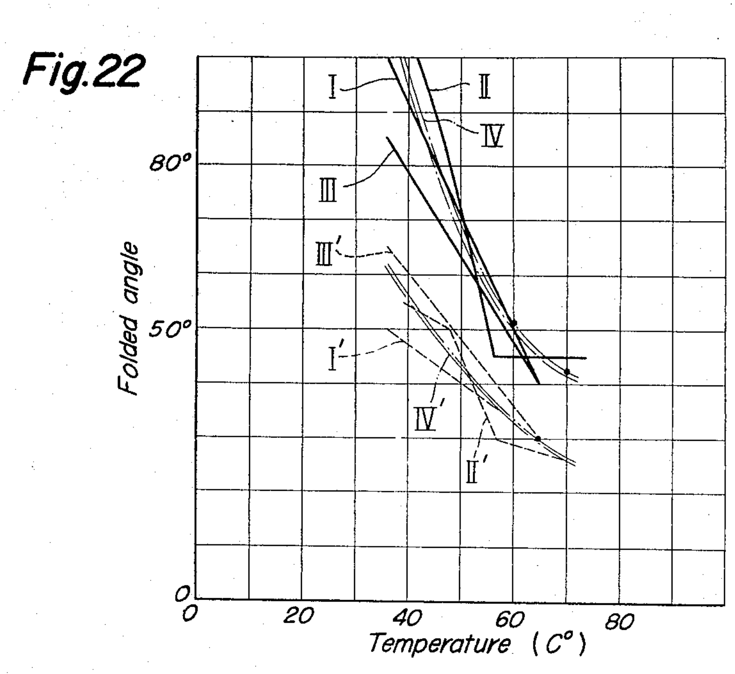
Figure 23:
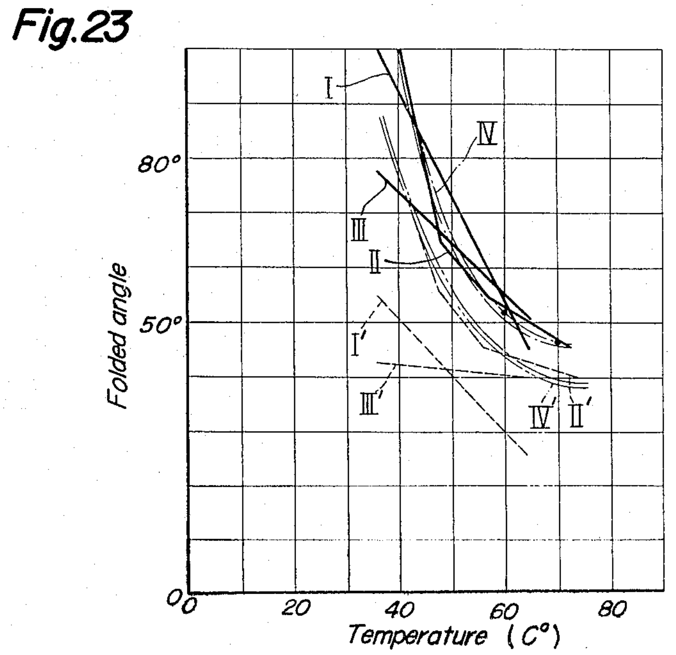
Figure 24:
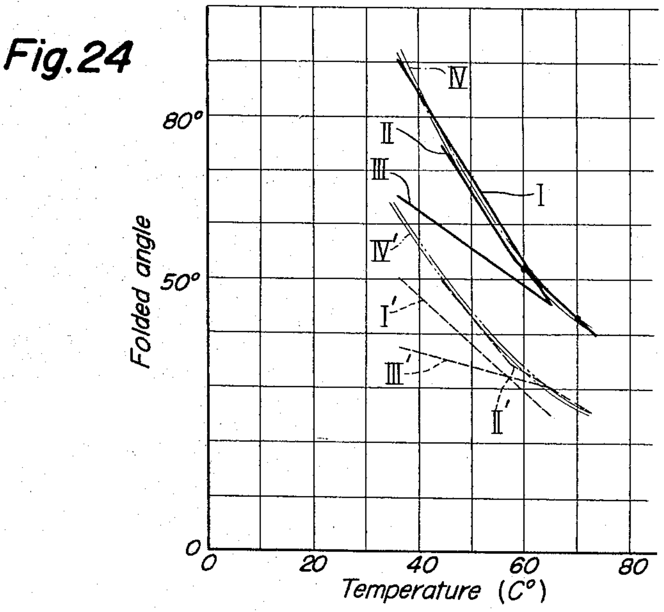
Figure 25:
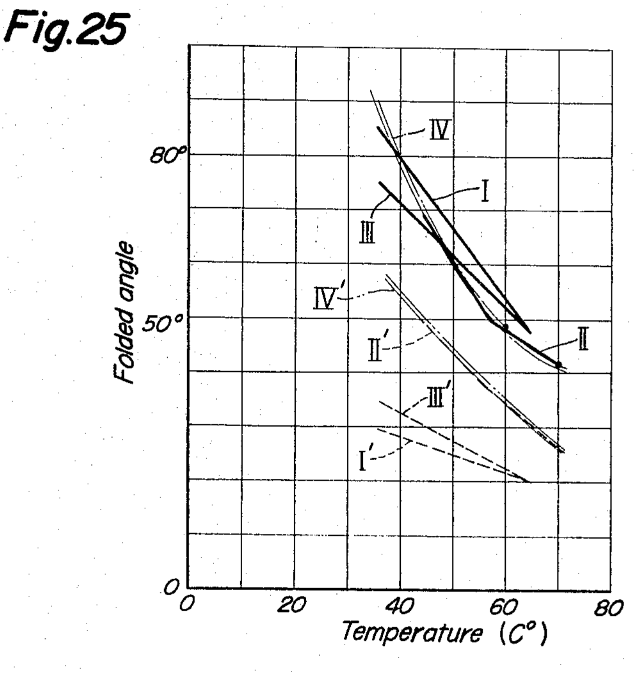
Figure 26:
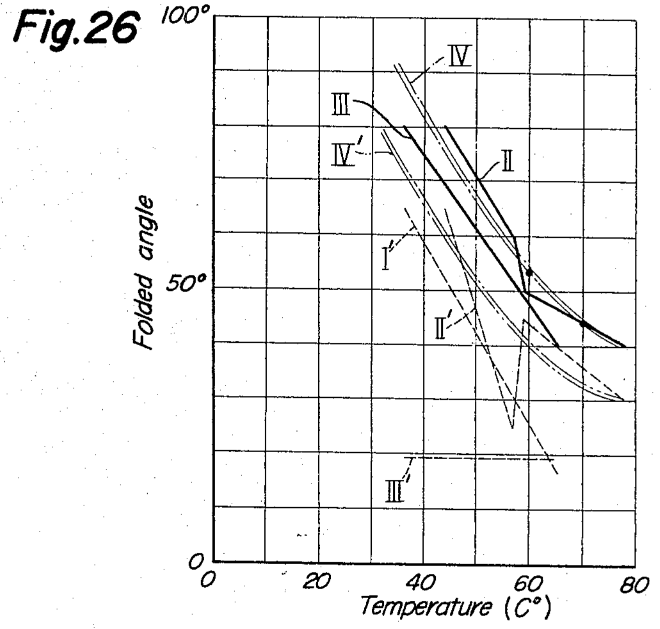
Figure 27:
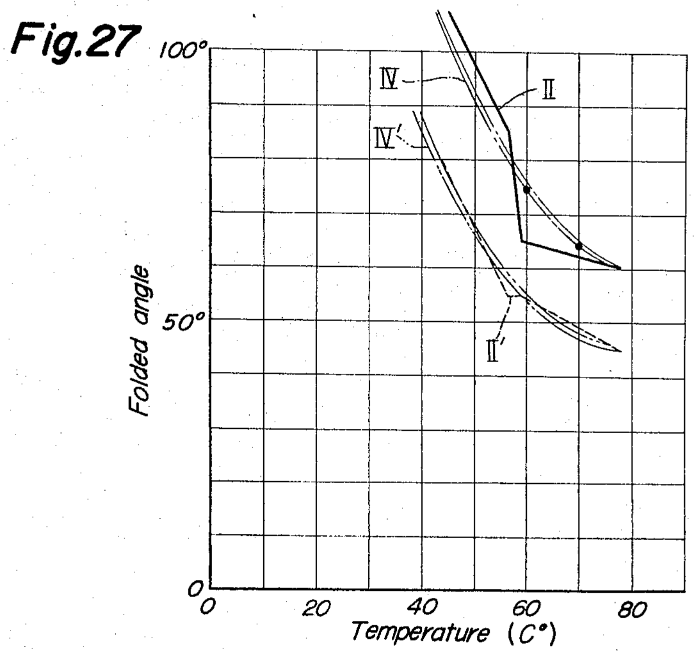

FIG. 18 also shows still another embodiment of a safety means applied to the cloth heater H previously mentioned. The safety means in this embodiment also takes the form of an electrical circuit. Or more precisely, a conductor **36*b* having a good conductivity is covered by a resin coating 36*a* such as of polyethylene, polypropylene, nylon or tetron. Two of such coated conductors are twisted with each other to form security wires 36. The security wires 36 are disposed at any portion of the cloth heater H where temperature control is desired. The security wires 36 are connected in parallel to the heating wires 16 through a switch 37, and a fuse 38** of a predetermined capacity is interposed between the cloth heater H and an electric source therefor to complete a circuit as shown in the drawing.

When, after the switch 37 has been closed, temperature of the cloth heater H reaches an unusual value at a portion or in its entirety thereof for any reason, the resin coating **36*a* fuses away, resulting in the short circuit of two conductors 36*b*, hence the short circuit in the heater circuit. Flow of an overcurrent will cut off the fuse 38**, thus cutting off the power supply to the heater H and preventing excessive temperature rise. According to this method, since the security wires can be made into a slender shape and disposed in any desired manner due to the elongated linear form, security of the cloth heater H can be insured over a portion or the entirety thereof. Further, the safety means is simple in construction and cheap in cost, which is suitable for mass production.

Figure 1:
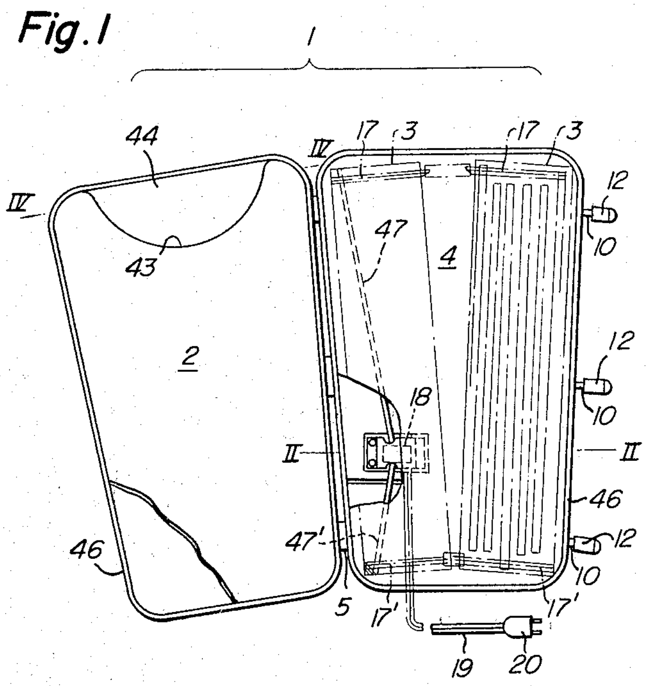
FIG. 1 is a plan view of a preferred embodiment of a laundry press according to the invention, with a heating member and a holding member shown in an open position, with a heating means provided in the heating member shown in dotted lines, and with a part of the heating member broken away to show a temperature regulator in an exposed condition.
Figure 2:
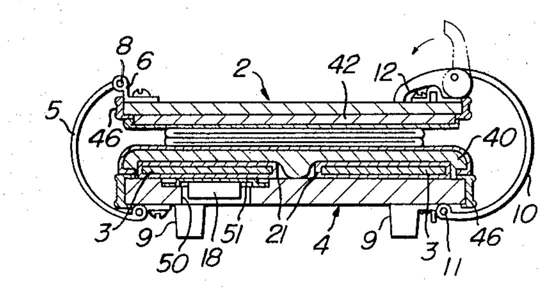
FIG. 2 is a sectional view of the press taken on the line II—II of FIG. 1, with the heating member and the holding member clamped together by means of a clamping means with articles held therebetween.
Figure 4:
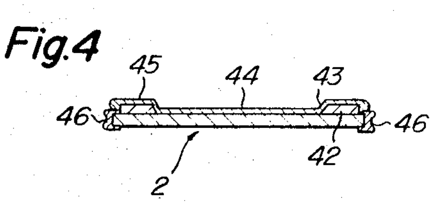
FIG. 4 is a sectional view of the holding member taken on the line IV—IV of FIG. 1.
Figure 3:
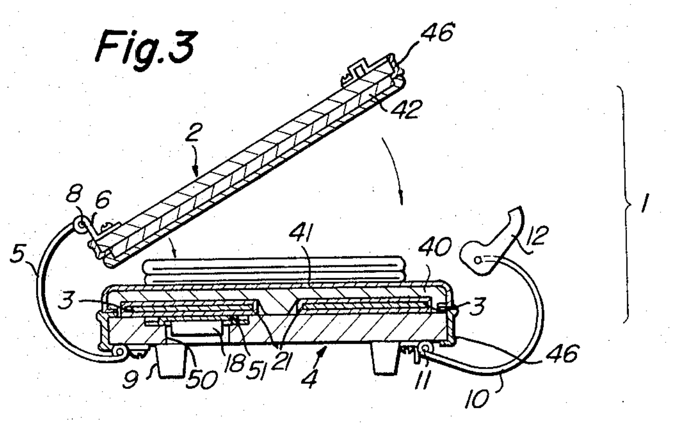
FIG. 3 is a view similar to FIG. 2, but showing the clamping means released and the holding member in a slightly lifted position away from the heating member.
Figure 5:
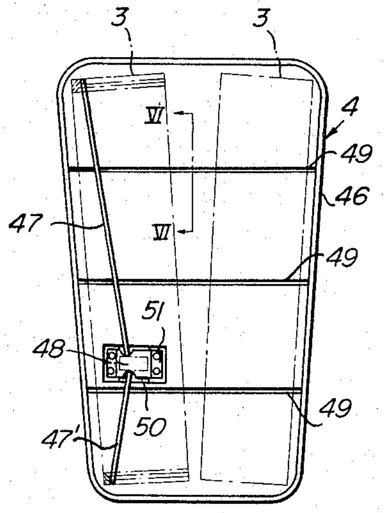
FIG. 5 is a plan view showing the body portion of the heating member, with a cover, cushion sheets and the heating means removed to show the internal structure thereof.
Figure 7:
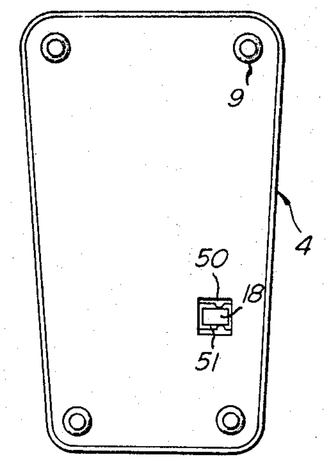
FIG. 7 is a back view of the heating member.

The heating means 3 or 3A formed in the manner as described are disposed in the heating member 4 as described. A pair of the heating means 3, for example, each having a predetermined heating capacity of substantially equal value are fastened onto the inner face of the heating member 4 by means of an adhesive with a sheet of a foamed plastic interposed therebetween, if required, as shown in FIGS. 1, 3 and 5. Then, on the pressing surface of the heating means 3, a cushion sheet 40 of a foamed plastic such as polyurethane is fastened by means of an adhesive. A cover 41 of a heat-resisting cloth is covered on the cushion sheet 40 at the side opposite the holding member in a manner to enclose the cushion sheet 40 and the side surfaces of the heating member 4. While, fastened onto the inner face of the holding member 2 is a cushion sheet 42 which is of the same material as the cushion sheet 40 but slightly thicker than that. The cushion sheet 42 is provided with a cut-out portion 43 at one end in the longitudinal direction thereof, said cut-out portion 43 extending inwardly therefrom in an arcuate form. Said cut-out portion 43, when the sheet 42 is fastened onto the holding member 2, forms a recess 44 which recedes inwardly from the pressing surface. The pressing surface of the cushion sheet 42 and the side surfaces of the holding member 2 are covered by a cover 45 which is similar to the cover 41.

The advantage which can be derived from the provision of the cushion sheets 40 and 42 is as follows: As described previously, the holding member 2 and the heating member 4 are openably connected together by means of the hinges, and during the hot-pressing of articles, such articles are held between the members and clamped by the clamping springs 10. When a pair of trousers, for example, is placed on the heating member 4, and the holding member 2 is swung toward the heating member 4, an entangling force will be exerted on the trousers in the direction of the arrow shown in FIG. 3, resulting in many wrinkles on the trousers at portions on the side of the hinges. The cushion sheets according to the invention will effectively absorb the force exerted on the trousers and at the same time will provide the tension to the trousers without causing any displacement of the crease. The cushion sheets 40 and 42, due to the structure of the foamed material, permit the conduction of electricity to the heating means under the clamped condition and permit the escape of moisture generated from the articles during hot-pressing thereof, directing the moisture outwardly from the sides of the contact portion between the members 2 and 4 through the foamed structure. Thus, the cushion sheets serve to prevent the wet state of the pressing surfaces due to the presence of moisture immediately after the application of heat.

Application of said covers 41 and 45 on the heating member 4 and the holding member 2, respectively, are performed by means of a tape which carries an adhesive on both surfaces thereof. Preferably, a sheet of paper may be fastened onto one or upper face of the tape, so that after the tape has been fastened onto the covers, the paper is stripped off the tape and a decorative band 46 of a synthetic resin such as polyvinylformal is fastened on the face to provide a beautiful appearance.

The covers 41 and 45 are made of a cloth having a more or less heat-resisting property and air permeability to provide for unusual temperature which may be reached in the case of failure of the cloth heater although the optimum temperature range of 60° to 80° C. is normally kept at the pressing surface. Most preferred for the covers are polyester fibers having excellent heat-resisting and anti-abrasion properties used in 100% although they are expensive. For the purpose of reduced cost, tetron or a mixed fabric composed of 30% polyester fibers blended with 70% artificial silk may be used. This material would not be degraded even under a temperature of 100° C. and has a high anti-abrasion property in comparison with rayon or polyamide fibers.

The cut-out portion 43 can be shaped in the following manner; a sheet of metal foil is disposed between the inner face of the holding member 2 and the cover 45, and a sheet of polyvinyl chloride is interposed between the metal foil and the cover 45, with a suitable cloth then placed on the pressing surface of the cover 45. Then, high-frequency heating is applied thereto under compression with the metal foil used as an electrode, which will fuse the sheet of polyvinyl chloride to provide the desired cut-out shape of good finish.

Figure 6:
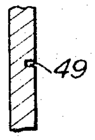
FIG. 6 is a sectional view of the body portion of the heating member taken along the line VI—VI of FIG. 5.

As described in the foregoing, the respective heating wires of the pair of heating means disposed in the heating member 4 are connected in series with each other and are further connected to the temperature regulator 18 by way of lead wires 47 and 47′, thence to an electric source through the cord 19. The lead wires 47 and 47′ are flexible and rated at a withstand voltage capacity of 6,000 volts and a current capacity of 3 amperes, having a flat shape of width of 3 mm. and thickness of 0.1 mm. The lead wires are attached to the inner face of the heating member 4 by means of a polyester film having a layer of adhesive thereon, and connect the heating wires 16 with the temperature regulator 18. The connections with the heating wires 16 are electrically insulated also by a polyester film having an adhesive layer. Since the lead wires are formed into a flat shape, the inner face of the heating member 4 is almost free from uneven appearance. A plurality of transverse grooves 49 of a suitable depth are formed on the inner face of the heating member 4 at intervals of a predetermined distance as shown in FIGS. 5 and 6 in order to prevent the bending of the heating member 4 due to repeated heating and prolonged use for years.

An opening 50 is provided at a suitable portion below one of the heating means 3 of the heating member 4, and a heat transmission plate 51 is disposed at the inner side of the opening 50 flush with the inside face of the heating member 4. The temperature regulator 18 described above is fitted on the heat transmission plate 51 by being received in the opening 50. The temperature regulator is provided with two safety elements and comprises a temperature fuse incorporated in a main element or a thermostatic control mechanism of a bimetal switch type. The temperature regulator is effective to control the current to the heating means to maintain the optimum temperature at the pressing surface of the heating member and, at the same time, operable to cut off the current in the event of an unusually high temperature due to an accidental failure in the thermostatic mechanism.

Figure 19:
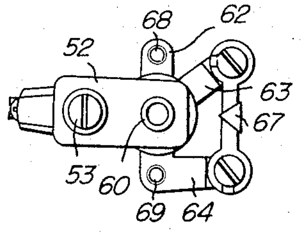
FIG. 19 is a top view of a temperature regulator for controlling the generation of heat by the heating means.
Figure 20:
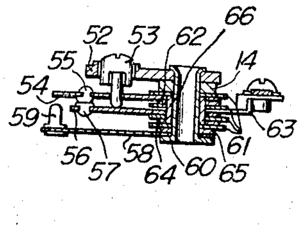
FIG. 20 is a longitudinal sectional side view of the temperature regulator of FIG. 19.
Figure 21:
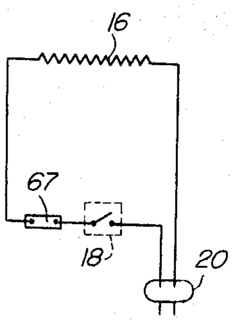
FIG. 21 is a connection diagram showing the electrical connection between the temperature regulator and the heating means.

Explanation will hereinunder be given with repect to the arrangement and advantage of the temperature regulator with reference to FIGS. 19 through 21. In the drawings, reference numeral 52 designates a supporting plate 52 for a temperature regulating screw 53 which is screwed into the plate 52. Numeral 54 indicates a carrier plate for a contact 55. Numeral 56 indicates a carrier plate for a contact 57 which is disposed opposite the contact 55, and urged towards and away therefrom. Numeral 58 indicates a bimetal having an insulated projection 59 such as of porcelain at one end thereof. Said supporting plate 52, carrier plates 54, 56 and bimetal 58 are stacked up in tiers and integrally connected together by a cylindrical tube 60. The end of the regulating screw 53 is freely passed through an opening provided at the carrier plate 54 and terminates adjacent the carrier plate 56. The insulated projection 59 of the bimetal 58 is disposed in opposition to the tip of the carrier plate 54. Insulating plates 61 are interposed between the carrier plate 54 and the supporting plate 52, the carrier plates 54 and 56, and the carrier plate 56 and the bimetal 58 to provide necessary electrical insulation. Terminal strips 62, 63 and 64 are also connected together with said plates by the cylindrical tube 60, the strip 62 contacting the carrier plate 54, the strip 63 contacting the carrier plate 56, and the strip 64 being disposed between the insulating plates 61. Washers 65 are interposed between the carrier plate 54 and the supporting plate 52, and the carrier plate 56 and the bimetal 58 to maintain a predetermined distance therebetween. A tubular insulating member 66 is provided about the cylindrical tube 60 to provide electrical insulation between the carrier plates 54 and 56, and between the terminal strips 62, 63, 64 and the cylindrical tube 60. A temperature fuse 67 is disposed between the terminal strips 63 and 64. Terminal screws 68 and 69 are provided on the terminal strips 62 and 64, respectively.

The temperature regulator having the above construction and arrangement operates in the following manner: At first, the temperature regulating screw 53 mounted on the supporting plate 52 is manipulated to determine the position of the contact carrier plate 56 to thereby provide a desired temperature setting. Then the wires from the electric source and the heating member are connected to the terminal screws 68 and 69 of the terminal strip 62 and 64, respectively, to form a circuit as shown in FIG. 21. Current then flows from the source to the terminal strip 64, thence to the temperature fuse 67, terminal strip 63, contact carrier plate 56, and to the contact carrier plate 54 through the contacts 57 and 55, finally reaching the heating wires 16 through the terminal strip 62.

A portion of heat generated by the heating wires 16 is transmitted from the temperature sensing portion through the cylindrical tube 60 to the bimetal 58, which gradually bends as temperature rises. The insulated projection 59 disposed at the free end of the bimetal 58 successively forces the contact carrier plate 54 upwardly until finally the contacts 55 and 57 are opened to cut off the current when the bimetal reaches the preset temperature. As the temperature of the bimetal 58 gradually goes down, the bimetal unbends and closes the contacts 55 and 57, which permit the flow of current through the circuit again. Such operation is given by the mechanism of the slow-acting thermostat described above.

However, excessive temperature rise in the press with resultant danger might be caused when the circuit would not open due to seizure of the contact 57 on the contact 55 or other accidental failure. According to the invention, heat of the press body is transmitted from the same temperature sensing portion through the terminal strips 64 and 63 to the temperature fuse 67, which is thereby fused off to cut off the current, thus preventing any danger.

Although, according to conventional electrical appliances having a thermostat such as of bimetal type, are also provided with a double safety mechanism comprising the thermostat and a temperature fuse for the purpose of preventing overheat of the appliances due to accidental failure in the thermostat. However, the temperature fuse is disposed separately from the main safety means or the thermostat, and is adapted to operate by air temperatures. The conventional regulator has satisfactorily worked in the case of regulation by sensing the action of gases or liquids, but, in the case of sensing from a solid mechanism, another sensing portion has had to be separately provided in addition to the sensing portion for the main regulating mechanism. This has resulted in increased cost and degradation of accuracy since different temperatures are sensed by different sensing portions. There has been a problem for using such regulator in appliances requiring accuracy since interrelation between both sensing portions is not uniform at all times. It has also been difficult to provide two sensing portions in a narrow space adapted for placement thereof.

However, the temperature regulator according to the invention is, as described above, the double safety means comprising the thermostatic regulating mechanism and the temperature fuse incorporated therein by providing the terminal strips 62, 63, 64 integrally with the regulating mechanism and disposing the temperature fuse 67 between the terminal strips 63 and 64. It will be obvious that this arrangement does not need any wiring and can be manufactured at low cost. Since also the sensing portion is common to the thermostat and the temperature fuse, there is no need of separate provision of a sensing portion for the temperature fuse, and accurate sensing can be made by the fuse, permitting accurate operation thereof. It is also obvious that the thermostat portion can be utilized as a thermo-switch or like means under equal effect, and the terminal screws can be conveniently replaced, thus rendering the entire construction inexpensive.

Next, the description will be directed to the superiority of pressing effect on articles to be pressed by the laundry press of the invention in comparison with the case of conventional ironing. In the conventional ironing, a maximum temperature or continuous endurable temperature wherein heating for elongated period of time will not cause the degradation of materials of articles to be pressed are 100° C. for woolen stuff, and 70° to 90° C. for cloth of chemically synthetic fibers. Therefore, it is said that, in the case of woolen stuff, heating at 155° C. for 3 to 5 seconds is optimum for obtaining the desired pressing effect without harming the stuff.

However, the ironing is performed by hand. Unless, therefore, one is not skilled in the art of compression and manipulation of the iron, irregularity of hot-pressing with respect to the article to be pressed will result and, in an extreme case, over-ironing may result in a burn on the cloth. When a multiplicity of same cloths are to be ironed, uniform pressing effect can not be obtained for respective articles because of inevitable differences in ironing speeds or like factors. Further, the articles to be pressed are heated to a temperature beyond the continuous endurable temperature thereof as described above, and each pressing operation must therefore be completed in a short period. Even though injury by heat can almost be neglected by such manner of operation, accumulation of such operation will shorten the life of cloths.

On the contrary, the laundry press of the present invention is provided with the heating means containing the cloth heaters comprising the flexible heating wires such as of stainless steel having the diameter of about 0.1 mm. interwoven with heat-resisting threads such as of polyvinylformal, wherein uniform temperature distribution below about 100° C. can be maintained at any portions of the pressing surfaces. Articles to be pressed are therefore subject to a uniform temperature of about 70° C. which is optimum for pressing. Said laundry press is effective to provide uniform hot-pressing of the articles without injuring the material thereof and demonstrates a more excellent pressing effect than with the ironing, thus permitting a simple and reasonable pressing operation.

As a rule, the pressing effect on articles to be pressed is determined by the interrelations between the temperature, time, moisture and pressure as known in the art. The condition for hot-pressing which is optimum for articles to be pressed can be obtained by measuring folded angles of the cloths of the articles created by the above interrelated conditions. The folded angle herein referred to indicates an angle of opening between two portions about the fold thereof when a piece of the cloth of a predetermined size folded double is clamped between a holding member and a supporting member having a heat source, and the cloth is taken out as soon as the hot-pressing is over.

In order to obtain the relations among:

(1) Effect of temperature (provided that pressure and time are constant),
(2) Effect of time (provided that temperature and pressure are constant),
(3) Effect of pressure (provided that temperature and time are constant), and
(4) Effect of moisture (with or without spray, excluding the effect by water content), to know the hot-pressing conditions with respect to the folded angle of the cloths in the laundry press of the invention, six kinds of cloths are selected. The cloths are thick worsted, thick flano, thin worsted, thin peen head, thin poral, and thin cloth of polyester synthetic fibers blended with woolen stuff. The cloth materials each have the width of 10 mm. and length of 20 mm. which are folded into two each having the width and length of 10 mm., with each one piece of the twofold pieces tacked to the face of the heating member by a pin or like means. These cloths are clamped between the heating member 4 and the holding member 2, and folded angles of the cloths after hot-pressing are measured. Results of the measurements are graphically illustrated in FIGS. 22 through 29, wherein FIGS. 22 through 27 show the effect of temperature, FIG. 28 shows the effect of time and FIG. 29 shows the effect of pressure. Effect of moisture is compared in the condition with or without spray. Solid lines in FIGS. 22 to 27 show the case without any spray and dotted lines show the case wherein four or five sprays are applied to the cloths.

Or more precisely, ordinates in FIGS. 22 through 27 show the folded angle of the cloths, while abscissae show the temperature under a constant hot-pressing time and pressure. As described above, FIGS. 22 through 27 show the measurements taken on the thick worsted, thick flano, thin worsted, thin peen head, thin poral, and thin cloth of polyester fibers blended with wool, respectively. Curves I in solid lines and I' in dotted lines show the measurements taken at pressure of 9.5 g./cm.$^2$ for hot-pressing time of 20 minutes with and without spray, respectively. Likewise, curves II and II', and III and III' show the measurements taken at pressures of 7.2 g./cm.$^2$ and 5.3 g./cm.$^2$ for hot-pressing time of 20 minutes with or without spray, respectively. Judging from the curves, it will be known that the relations of the folded angle of the cloths with respect to the heating temperature under a constant hot-pressing time and pressure change as shown by chain-dotted lines IV and IV' for experiments without and with spray, respectively. The following table shows the folded angle at 60° C. and 70° C. for each of the cloths and difference in the angles on the basis of the chain-dotted lines IV and IV'.

of 60° C. without and with the application of spray, respectively. From the curves, it will be known that the folded angle without spray ceases to be improved any further after the hot-pressing time of from 30 to 40 minutes and the folded angle with spray makes an improvement, though slightly, even during the hot-pressing time of between 30 to 60 minutes.

FIG. 29 shows the relation between the folded angle and the pressure at a constant heating temperature and hot-pressing time, wherein the ordinate and abscissa indicate the folded angle and the time, respectively.

Curves VI and VI' show the measurements taken at the heating temperature of 65° C. for the hot-pressing time of 20 minutes without and with spray, respectively. From these curves, it will be apparent that, between the pressure range of from 3 g./cm.$^2$ to 20 g./cm.$^2$, there is virtually no change in the folded angle.

From the foregoing test results, it is obvious that, by employing a heating temperature in the order of 70° C., a hot-pressing time of from about 30 to 50 minutes, and a comparatively light pressure sufficient for maintaining the articles under a clamped state, and by providing a suitable amount of moisture as by spraying, it is possible to obtain an ideal pressing effect to suit the hot-pressing condition of the articles.

The laundry press of the present invention is, as described in detail in the foregoing, constructed and arranged to suit said optimum hot-pressing conditions. Therefore, it will be understood that said press can uniformly hot-press articles to be pressed without inflicting any injury thereon and give a much more excellent pressing effect than with conventional ironing. The laundry press can be manufactured at low cost and permits simple manipulation to provide a reasonable pressing operation.

Although the invention has been described with reference to specific embodiments thereof, it will be understood that various changes and modifications may be made without departing from the spirit and scope of the

| | Heating Temperature | | | | Difference in angle | |
|---|---|---|---|---|---|---|
| | Folded angle at 70 ° C. | | Folded angle at 60 ° C. | | | |
| With or without moisture | Without spray | With spray | Without spray | With spray | Without spray | With spray |
| Classification of cloths: | | | | | | |
| Thick worsted | 43° | 27° | 51° | 34° | 8° | 7° |
| Thick flano | 46° | 39° | 52° | 44° | 6° | 5° |
| Thin worsted | 43° | 27° | 52° | 34° | 9° | 7° |
| Thin peen head | 41° | 27° | 48° | 35° | 7° | 8° |
| Thin poral | 44° | 33° | 53° | 43° | 9° | 10° |
| Thin cloth of polyester fibers blended with wool | 64° | 48° | 74° | 55° | 10° | 7° |

It will be apparent from the above table that, irrespective of the kinds of cloths; any one of the cloths shows a smaller folded angle at a higher heating temperature with a resultant better pressing effect; application of spray muct improves the pressing effect since the folded angle is influenced by the presence of moisture, that is, with or without the application of spray; the folded angles make a change of about 10° for both of with and without spray with respect to a temperature variation of 10° C. within the heating temperature range of between 60° C. and 70° C.; and the folded angles can not be improved more than those at about 70° C. irrespective of the kind of cloths and with or without the application of spray.

FIG. 28 shows the relation between the hot-pressing time and the folded angle of the cloths at a constant heating temperature and pressure, wherein the ordinate and abscissa indicate the folded angle and time, respectively. Curves V and V' show the measurements taken at the pressure of 7.2 g./cm.$^2$ at the heating temperature claims thereof which will be affixed herewith for the clarification of the invention.

What is claimed is:

1. A laundry press comprising a heating member and a holding member openably coupled together by means of a hinged connection, said heating member including a plate, heating means disposed on said plate, said heating means including a cloth heater, said cloth heater comprising a cloth of a predetermined size woven of woofs and warps of heat-resisting fibers, and including conductive flexible metal wires disposed lengthwise on both sides of the cloth and interwoven with the warps, and electric heating wires disposed transversely between said conductive metal wires situated on both sides of the cloth and woven into the cloth zigzag-wise in the direction of the woofs and spaced a predetermined distance apart from said woofs so that said heating wires are disposed in a wave-like form with respect to the cloth surface, said heating wires each having heat-resisting threads coiled thereabout at a predetermined number of turns per unit length thereof, and said heating wires being wound about said conductive wires alternately at turned-over portions on the left- and right-hand sides thereof at intervals of a predetermined distance with each other, and a cushion member embracing said heating means and fastened onto said plate, said holding member including a plate and a cushion member fastened onto said plate on the side opposite side heating means, a temperature regulator provided on said heating member for maintaining the heating temperature of said heating means at a desired regulated value, and clamping means for releasably clamping said holding member and said heating member.

2. A laundry press according to claim 1, wherein said cloth heater has a woven structure of cloth of woven woofs and warps in the form of quartz threads of heat-resisting and non-conductive properties.

3. A laundry press according to claim 1, characterized in that said cloth heater is provided with a dipped coating of polyester solution thereon, and a polyester film of a thickness in the order of $\frac{12}{1000}$ mm. on both coated surfaces of said heater fastened thereon by making use of adhesion of said polyester coating.

4. A laundry press according to claim 1, characterized in that said heating means comprising said cloth heater is a plate being entirely covered by an insulating coating of a synthetic resin material.

5. A laundry press according to claim 1, characterized in that said heating means includes a heat-resisting, moisture-resisting and moisture impervious film stuck at least on the pressing surface of said heater by means of an adhesive, and a thin layer of a foamed material further fastened on the film provided on said heater, said cushion member being fastened thereon to cover the entirety of said heater with said film and layer.

6. A laundry press according to claim 2, characterized in that said cloth heater comprises fusible electric heating wires of flexible nature of a diameter of 1 to 1.5 mm. including a core of heat-resisting fibers formed into a twisted thread of about 0.5 mm. in diameter, a conductive element of conductive material fusible below a temperature of 200° C. and spirally wound about said core, and a resinous material such as polyvinyl chloride covered thereon.

7. A laundry press according to claim 2, wherein detecting wires are woven in the cloth in closely juxtaposed relationship with said heating wires whereby said detecting wires detect an unusual temperature whenever the heating temperature exceeds a predetermined regulated temperature.

8. A laundry press according to claim 2, wherein said cloth heater includes security wires interposed in said heating wire circuit, said security wires including two wires twisted with each other each having a conductor of good conductivity covered by a synthetic resin material of low melting point, whereby said synthetic resin material predisposed to fuse at a predetermined temperature fuses and short-circuits a control circuit of said heating wires when the heating temperature developed by said heating wires exceeds a predetermined regulated temperature so that a fuse interposed in said heating wire circuit is thereby fused off to cut off power supply.

9. A laundry press according to claim 1, characterized in that said cushion member is formed of a foamed plastic.

10. A laundry press according to claim 1, characterized in that a cover of a heat-resisting and moisture-resisting cloth is fastened onto the surfaces of said cushion members provided on said heating member and holding member.

11. A laundry press according to claim 1, characterized in that a recess corresponding to pocket portions of trousers is provided at one longitudinal end of the pressing surface of said holding member.

12. A laundry press according to claim 1, characterized by a heat transmission plate, an opening provided at the central portion of the plate surface of said heating member, and means mounting said temperature regulator in said opening, said plate covering said opening.

13. A laundry press according to claim 1, characterized in that the heating means and the temperature regulator disposed in said heating member are connected by means of flat lead wires of flexible nature.

14. A laundry press according to claim 1, characterized in that grooves are provided on the inner surface of the plate on which the heating means of said heating member are disposed, said grooves being effective to prevent the bending of said plate due to repeated heating and presence of moisture.

15. A laundry press according to claim 1, wherein the heat-resisting fibers forming the woofs and warps of the cloth are made of a material such as polyvinylformal.

References Cited by the Examiner

UNITED STATES PATENTS

| | | | |
|---|---|---|---|
| 1,498,655 | 6/1924 | Hauptman. | |
| 1,950,498 | 3/1934 | Lehnen et al. | 38—71 |
| 2,317,406 | 4/1943 | Ryan | 38—71 |
| 2,458,801 | 1/1949 | Schwartz | 219—545 |
| 2,461,006 | 2/1949 | Sowers | 38—71 |
| 3,114,825 | 12/1963 | Kilburn et al. | 219—212 X |

FOREIGN PATENTS

| | | | |
|---|---|---|---|
| 815,720 | 7/1937 | France. | |

JORDAN FRANKLIN, *Primary Examiner.*

PATRICK D. LAWSON, *Examiner.*

UNITED STATES PATENT OFFICE

CERTIFICATE OF CORRECTION

Patent No. 3,290,807 December 13, 1966

Takeo Esaka

It is hereby certified that error appears in the above numbered patent requiring correction and that the said Letters Patent should read as corrected below.

In the heading to the printed specification, lines 3 and 4, for "Matsushita Electric Industrial Co." read -- Matsushita Electric Industrial Co., Ltd. --.

Signed and sealed this 24th day of September 1968.

(SEAL)
Attest:

Edward M. Fletcher, Jr.
Attesting Officer

EDWARD J. BRENNER
Commissioner of Patents